INVENTOR
NILS S. HOLM

3,533,840
METHOD AND APPARATUS FOR CLEANING STERILIZING PLANTS

Nils Sune Holm, Lund, Sweden, assignor to Alfa-Laval AB, Tumba, Sweden, a corporation of Sweden
Filed Apr. 27, 1966, Ser. No. 545,698
Claims priority, application Great Britain, Apr. 29, 1965, 18,064/65; Sweden, May 13, 1965, 6,230/65
Int. Cl. A23c *3/02;* B08b *9/06;* C23g *1/14*
U.S. Cl. 134—22                            4 Claims

---

ABSTRACT OF THE DISCLOSURE

In a plant having heating means for continuous sterilization of a liquid and having means for flowing the liquid continuously through the heating means, the plant is cleaned by shutting off the flow of said liquid through the plant and by passing a cleaning medium through the plant to sterilize this medium by the heating means, while operating the plant in the same manner as when sterilizing said liquid.

---

Figure 1:
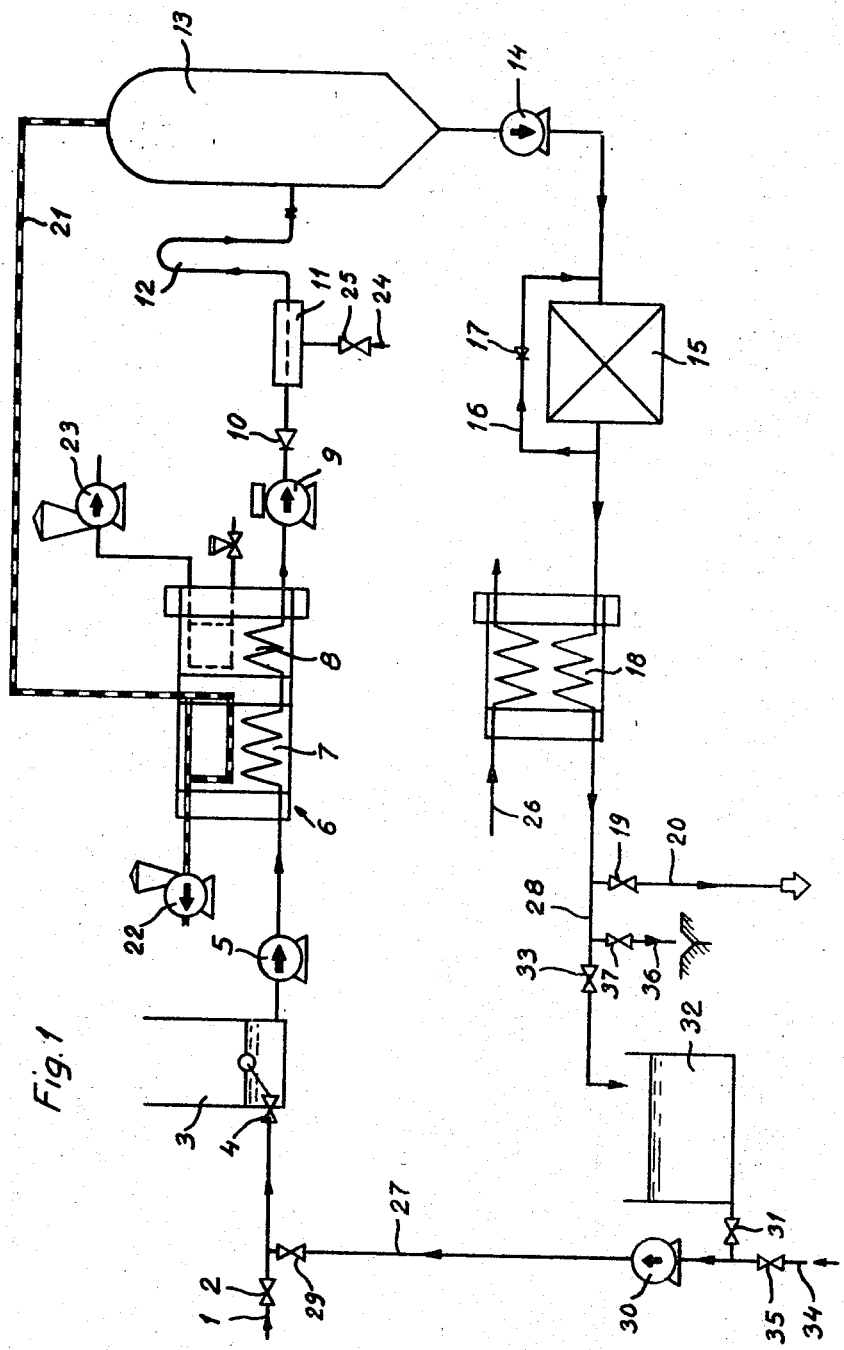

Plants for continuously sterilizing a stream of fluid are well known. An example of a plant of this kind is a plant for the sterilization of milk, and in the following description of embodiments according to the invention, plants for the sterilization of milk will be referred to. This does not mean that the present invention relates only to such plants. On the contrary, it is applicable to all kinds of sterilization plants for a continuous operation, that is, when the substance to be sterilized passes through the plant in a continuous flow for a comparatively long period of time.

Such plants have to be cleaned sooner or later, as various precipitations and incrustations are formed in it.

An object of the present invention is to make it possible to clean the plant under such conidtions that the interruption of the continuous sterilization process will be as short as possible.

A further object is to make it possible to perform the cleaning operation so that it will not be necessary to sterilize the plant after the cleaning and before the sterilization of the substance to be sterilized is resumed.

A still further object of the present invention is to maintain the sterilization plant in an aseptic condition during the cleaning operation.

A still further object again is to clean the plant under conditions that will decrease the costs of materials consumed during the cleaning operation, and to save time.

Still further objects and advantages will be apparent from the following description of embodiments of the method according to the invention and the description of apparatus for carrying out the method according to the same.

The method of cleaning according to the invention is characterized mainly in that one or a series of cleaning media are passed through the sterilization plant, the flow of substance to be sterilized being temporarily shut off, and the plant in the meantime operating as when sterilizing.

This means that when, for instance, the sterilization is performed by means of heating the substance to be sterilized to the sterilizing temperature, the heating devices of the plant are kept operating during the cleaning operation, thus sterilizing the cleaning media as well, the result being that the plant is kept in an aseptic condition all the time.

In a modified method according to the invention, the permanent sterilizing devices of the plant are supported by an auxiliary sterilizing device arranged to be incorporated into the sterilization plant during the cleaning operation. This auxiliary sterilizing device, such as a steam injector, may be connected to the plant or to a conduit leading the cleaning medium or media to the plant. A plurality of such auxiliary sterilizing devices may even be arranged to take over the function of the permanent sterilizing means of the plant during the operation of cleaning, thus making it possible to shut them off partly for repairs or general maintenance. It is to be observed, however, that this does not mean that the permanent sterilizing means of the plant are cut out of the plant during the cleaning operation according to this modified method. On the contrary, those parts of the permanent sterilizing means which form a part of the flow path must, of course, remain connected, so that they maintain their aseptic condition during the cleaning operation.

It should be noted that the sterilization plants do not necessarily sterilize by means of heat. They may be provided with sterilizing devices of a quite different nature, for example, means generating ultraviolet rays.

Sterilizing plants for milk usually operate continuously in that the milk flows through them continuously. That is, the raw, unsterilized milk first passes through a first part, in which the milk is preheated in one or more steps, whereupon it is brought to sterilizing temperature in a second part, the said temperature generally being about 130°–140° C., whereupon it is passed through a holding-cell, in which it may maintain its high sterilizing temperature a short time before it is cooled down quickly in a third part of the plant, usually by expansion in a vacuum vessel, then possibly homogenized in a fourth part and thereafter cooled to packing temperature in a fifth part, and packed directly in vessels for storing. In the vacuum vessel, the milk is freed from objectionable gases and possibly evaporated by vaporization to a desired content of dry substance. Such plants are entirely closed in order that they may be quite sterile from the sterilizing point to the packaging point and remain sterile also during operation.

Such sterilizing plants, however, cannot operate continuously for an unlimited time, because particles will be deposited on the inner walls of the plant, which interfere with the heat balance, jeopardize the sterilization, and could cause an objectionable taste of the product. The plants must therefore be cleaned, from time to time, with water and lye or other purifying agents.

In the cleaning operation as usually performed, the plant is first emptied of milk, thereafter rinsed with water at 70° C., then flushed with lye at 70° C., and finally washed over a very long period of time with water at 140° C. so that the plant will definitely become quite sterile again.

The normal operation of the plant is stopped during the cleaning operation; and whether the plant is washed in the above-mentioned manner with water and lye, or is dismantled when cleaning it in order to scour and rinse its internal parts, the result will be that the plant is unsterile and must be sterilized again before its normal operation is resumed. Such re-sterilizing is done with water of high temperature, about 140° C., which is flushed through the plant over a long time period. Only then is the plant in condition to operate again for the sterilizing of milk.

It is apparent that such a cleaning and sterilization operation is time-consuming, requires much work, involves great expenditures, consumes much water, requires heating apparatus for the water and the lye and, not least, requires long interruptions for the cleaning operation and, as a result, a lowering of the capacity per day of the plant for sterilizing of milk.

It is an object of the present invention to obviate the said disadvantages in connection with sterilizing plants of the kind indicated, and to provide a plant which may quickly be changed from continuous sterilizing of milk to continuous cleaning of the plant, and back again to sterilizing of milk, at the same time saving much water and permanently maintaining the sterility and the aseptic condition of the part of the plan which must be aseptic during operation.

Figure 2:
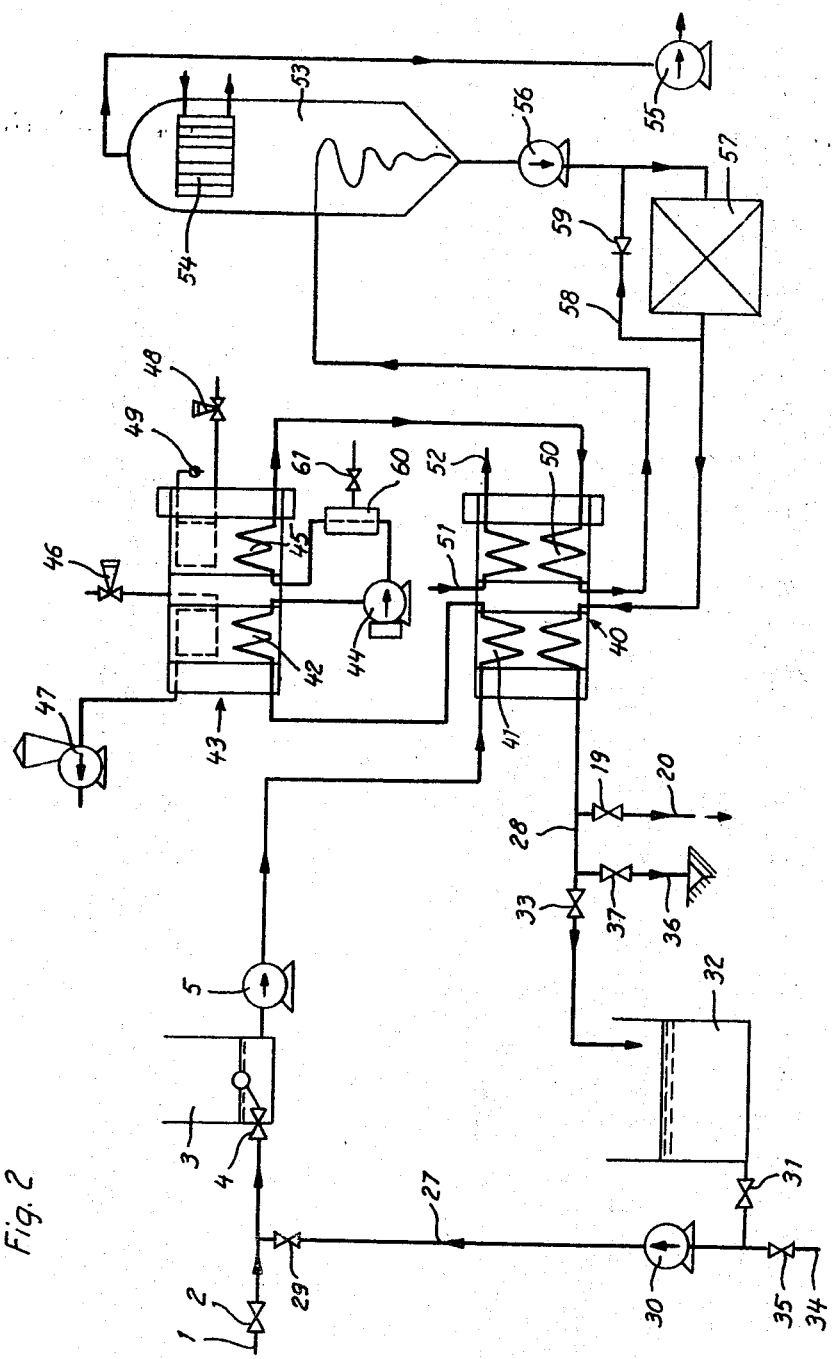

Examples of the invention are illustrated schematically in the attached drawings, FIG. 1 of which shows one embodiment of such a plan and FIG. 2 another embodiment.

In the embodiment according to FIG. 1, the milk or other liquid to be sterilized enters through pipe line 1 and milk inlet valve 2 to the balancing-vessel 3, which is provided with a float controlled valve 4. From the vessel 3, the milk is tranported by a pump 5 through a preheater 6 in the form of a two-stage plate heat exchanger 7 and 8, respectively, and is then delivered by pump 9 through a counter-pressure valve 10 to a steam injector 11 and a holding-cell 12 and enters a vacuum chamber 13. The milk is delivered by a pump 14 from chamber 13 through a homogenizer 15, provided with a return pipe line 16 and a counter-pressure valve 17. After passing through a plate heat exchanger 18, acting as a cooler, and a shut-off valve 19, the milk departs through pipe line 20 to packing machines (not shown). Gas and evaporated steam are sucked from the chamber 13 through pipe 21 by the vacuum pump 22 and pass through the first stage 7 of the heat exchanger 6, acting as a heating medium. The second stage 8 of the heat exchanger 6 receives its heat from steam sucked through it by the vacuum pump 23. The preheated milk is brought to sterilizing temperature in the steam injector 11, high pressure steam being injected directly from pipe 24 by way of valve 25. The heat exchanger 18 is cooled with cold water from pipe line 26.

A cleaning arrangement comprising a conduit 27, 28 is connected to the above described sterilizing plant for the milk. The conduit is connected with its one end 27 immediately after the milk inlet valve 2 and with its other end 28 immediately before the milk outlet valve 19. In the conduit 27, 28 there are in sequence, starting from valve 2, a first shut-off valve 29, a pump 30, a second shut-off valve 31, a vessel 32 for lye, and a third shut-off valve 33. Also, connected between the pump 30 and the valve 31 is a flush water pipe 34 provided with a fourth shut-off valve 35; and between the valves 33 and 19 is a pipe 36 provided with a fifth shut-off valve 37 and leading to a sewer (not shown).

The sterilizing plant as such is known per se as well as its manner of operation, and it is considered to be in full operation. Valves 29, 33, 37, 31 and 35 are then closed. Sterility is prevailing in the plant. According to the invention, it is now possible to change the plant quickly from sterilizing of milk to cleaning of the plant by shutting off valve 2, starting pump 30 and opening valves 29 and 35, the other parts of the sterilizing plant operating as before. The pump 30 then forces the flush-water via valve 29 into the sterilizing plant, and as it passes through the plant, the water is sterilized and pushes the remaining milk before it and out through valve 19. Immediately before the remaining part of the milk escapes through valve 19, the latter is closed and valve 37 is opened, whereby flush water in a sterile condition escapes through pipe 36 into the drain. As soon as the flush liquid seems to be transparent or clear, valve 35 is shut and valve 31 for lye is opened, which lye is now in its turn forced by pump 30 through the sterilizing plant and sterilized, while at the same time the lye pushes the flush-water before it so that it escapes through the pipe 36. When lye begins to escape through pipe 36, valve 37 is closed and valve 33 is opened, so that the lye can return to the vessel 32 and be recirculated through the plant. As soon as the treatment with lye is completed, valve 31 is closed and valve 35 for flush water is opened again, the flush water being forced through the sterilizing plant by the pump 30 and sterilized while at the same time driving the lye before it to vessel 32. When the remaining part of the lye has escaped into vessel 32, valve 33 is closed and valve 37 is opened, whereby the sterile flush water escapes through pipe 36 until the plant is flushed free of lye.

Valves 35 and 29 are then closed, and valve 2 for milk is opened, and when the entering milk, driving the flush water before it, escapes through pipe 36, valve 19 is opened and valve 37 is closed, and the plant now operates again entirely for sterilizing of milk.

It is obvious from the described example that the plant can quickly be shifted from continuous sterilizing of milk to continuous cleaning and back again to sterilizing of milk. Any shutting down or dismantling of the sterilizing plant as such in connection with its cleaning is not required, but the sterilizing plant is used for heating of the flush water and the lye to sterilizing temperature by a simple shifting of a number of valves, whereby the plant during the whole cleaning operation maintains its aseptic condition required for sterilizing of milk. Consequently, no additional heating means for the flush water or the lye are required for the cleaning operation. Other advantages are that all the different stages of the cleaning operation occur at a higher temperature than otherwise is the case, whereby the cleaning will be much more effective and requires a shorter time per stage than at a lower temperature, which means that water and pump-work are saved, and especially that the last flushing operation can be performed with considerably less water than heretofore.

In the embodiment according to FIG. 1, the milk and the cleaning liquid, respectively, are brought to sterilizing temperature by direct injection of steam in the steam-injector 11. The steam thus condensed in the milk or in the cleaning liquid is then removed in the vacuum chamber 13 by vaporization and evacuation of the steam by the pump 22.

The embodiment according to FIG. 2 is in many respects like the embodiment according to FIG. 1, and therefore the same reference numerals are utilized in both figures with reference to details which are exactly alike. In the embodiment according to FIG. 2, however, an indirect method of heating of the milk to sterilizing temperature is used, as well as for heating of the cleaning liquids; but as an alternating even here, the cleaning liquids could be brought to sterilizing temperature by direct steam injection.

When the milk in the plant according to FIG. 2 comes from the pump 5, it first passes through the first stage 41 of a heat exchanger 40 of the plate-apparatus type, in which it receives its first preheating, and then passes through the first stage 42 in another heat-exchanger 43 of plate-apparatus type and is thereafter delivered by a pump 44 through a second stage 45 of the same heat-exchanger, in which the milk is heated indirectly to sterilizing temperature. The first stage 42 of that heat-exchanger is heated by waste-stream which enters through valve 46 and is sucked away by vacuum pump 47. The second stage 45 of the same heat-exchanger is heated by high pressure steam entering through valve 48 and escaping through outlet 49. The milk flows from the heat-exchanger 43 through the second stage 50 of heat-exchanger 40, where it is cooled indirectly by means of cold water which enters at 51 and escapes at 52. After having been cooled down somewhat from its high critical sterilizing temperature, the milk enters the vacuum chamber 53 where it is rapidly cooled owing to evaporization, and is collected at the bottom of the chamber. The evaporated steam is cooled to condensate by the cold-water-cooled condenser 54, which condensate is collected at the bottom of the chamber and mixed with the milk which thereby maintains its content of water unaltered. The vacuum pump 55 keeps a desired vacuum in the chamber 53. The milk is pumped by pump 56 from the bottom of chamber 53 and passes through the homogenizer 57 which is provided with a recirculating line 58 and a counter-pressure valve 59. The milk proceeds from the homogenizer 57 to the secondary side of the first stage 41 in heat-exchanger 40, where it is cooled further by transmitting heat to the primary side of the same stage, and escapes through the milk outlet valve 19 and pipe 20 to the packing machines.

In the same manner as the milk is sterilized by heating indirectly in the second stage 45 of heat-exchanger 43, the cleaning liquid is sterilized during the cleaning operation. If it is not desired to heat the cleaning liquid indirectly to sterilizing temperature in stage 45 of heat-exchanger 43 during the cleaning operation, the steam may be shut off by valve 48 and a steam-injector 60 may be connected between pump 44 and the stage 45 instead, which injects high pressure steam directly through valve 61 into the cleaning liquid and sterilizes it. The steam injector 60 will then be used only for heating of the cleaning liquid but not for heating of the milk, and is consequently shut off from steam-supply during sterilizing of the milk. The condensed steam, resulting from the injected steam, may be permitted to dilute the cleaning liquid but must not dilute the milk, because although the condensate will evaporate in the vacuum chamber 53, it will be condensed again in the cooler 54 and mixed with the milk or with the cleaning liquid at the bottom of the chamber 53.

The plants in FIGS. 1 and 2 operate in the same manner in that they alternately sterilize the milk and clean the plant with a sterilized cleaning liquid.

The plants are described here as sterilizing plants with respect to the milk as well as to the cleaning medium, but it is obvious that the same plants could be used for only pasteurization of the milk, in which case the cleaning liquid will be brought to pasturizing temperature only during the cleaning operation. The cleaning liquid may, however, be brought to a higher temperature during the cleaning operation if the steam injection through valve 25 in FIG. 1 and valve 61 in FIG. 2 is increased.

I claim:

1. In the operation of a sterilizing plant having heating means for continuous sterilization of a liquid, such as milk, and means for flowing the liquid continuously through said heating means, the method of cleaning said plant while maintaining it sterile which comprises shutting off the flow of said liquid through the plant, and passing a cleaning medium through the plant to sterilize the medium by said heating means, while operating the plant in the same manner as when sterilizing said liquid.

2. The method defined in claim 1, comprising also the step of adding heat to the cleaning medium, in addition to the heat supplied by said heating means, as the cleaning medium is passed through the plant.

3. A method according to claim 1, in which said liquid is milk and comprising also, before passing said cleaning medium through the plant, passing a flushing liquid through the plant to flush residual milk therefrom, then, after passing said cleaning medium through the plant, passing additional flushing liquid through the plant, and then passing milk through the plant to flush residual flushing liquid therefrom, the plant being operated continuously throughout these steps to sterilize the flushing liquid and cleaning medium and finally the milk.

4. In the operation of a sterilizing plant having means for continuously sterilizing a liquid, such as milk, and means for flowing the liquid continuously through said sterilizing means, the method of cleaning said plant while maintaining it sterile which comprises shutting off the flow of said liquid through the plant, and passing a cleaning medium through the plant including said sterilizing means and said flow means while subjecting said cleaning medium to a sterilizing step.

References Cited

UNITED STATES PATENTS

| 2,100,327 | 11/1937 | Getchell | 99—249 X |
| 2,620,106 | 12/1952 | Weeks et al. | |
| 2,770,248 | 11/1956 | Audia | 134—18 X |
| 2,818,076 | 12/1957 | Erling. | |
| 3,072,503 | 1/1963 | Baum. | |
| 3,092,503 | 6/1963 | Gray | 99—249 X |
| 3,101,041 | 8/1963 | Hallström | 99—251 |
| 3,251,405 | 5/1966 | Hallström | 99—251 |
| 3,254,943 | 6/1966 | Palm | 99—251 X |

FOREIGN PATENTS 154,237   5/1949   Australia.

MORRIS O. WOLK, Primary Examiner

D. G. CONLIN, Assistant Examiner

U.S. Cl. X.R.

99—249; 134—2, 29